United States Patent [19]

Hufford

[11] 3,865,228

[45] Feb. 11, 1975

[54] MATERIAL HANDLING DEVICE

[75] Inventor: Donald L. Hufford, Charlevoix, Mich.

[73] Assignee: Hufford Industries, Inc., Charlevoix, Mich.

[22] Filed: Mar. 20, 1973

[21] Appl. No.: 343,123

Related U.S. Application Data

[62] Division of Ser. No. 185,052, Sept. 30, 1971, Pat. No. 3,741,374.

[52] U.S. Cl. ................. 198/176, 198/218, 198/221
[51] Int. Cl. ............................................. B65g 19/00
[58] Field of Search ........... 198/168, 171, 175, 176, 198/218, 221, 222, 24; 74/37

[56] References Cited
UNITED STATES PATENTS

| | | | |
|---|---|---|---|
| 1,900,657 | 3/1933 | Newhouse | 198/176 |
| 1,970,620 | 8/1934 | Park | 74/37 |
| 2,924,325 | 2/1960 | Kay et al. | 198/168 |
| 3,538,777 | 7/1969 | Bender | 74/37 |
| 3,741,374 | 6/1973 | Hufford | 198/221 |

*Primary Examiner*—James B. Marbert
*Assistant Examiner*—Joseph E. Valenza
*Attorney, Agent, or Firm*—Price, Heneveld, Huizenga & Cooper

[57] ABSTRACT

The drive mechanism for a sheet metal loader having a reciprocating carriage adapted to receive blanks and parts and feed them into a press includes a pusher mechanism mounted on a continuous sprocket driven chain moving forward and backward along an upper and lower path in a vertical plane. First and second rollers project from each side of the chain for engagement in a pair of spaced yokes having elongated vertical slots for receipt of the roller. One of the yokes and slots extends the full vertical spacing of the chain for continuous confinement of the first roller to move the carrier continuously and reciprocally. The other yoke and slot terminate above the sprocket axle with the lower end open to accommodate insertion and removal of the second roller for driving engagement during the forward drive movement of the carriage. The carriage and guide are adjustable to accommodate various size parts or material.

4 Claims, 8 Drawing Figures

MATERIAL HANDLING DEVICE

CROSS-REFERENCE TO RELATED APPLICATION

This is a division, of application Ser. No. 185,052, filed Sept. 30, 1971, now U.S. Pat. No. 3,741,374.

BACKGROUND OF INVENTION

This invention relates to material handling devices and, more particularly, to loaders and unloaders for feeding stock into presses and receiving and transferring the work piece after its formation.

With the advent of automation, and the subsequent introduction of various automatic high production equipment, material handling has become a key to the proper utilization of such equipment to its fullest capabilities. In light of the high cost of such machinery, complete utilization is mandatory. For example, press rooms have long needed a low-cost, high performance material handling device which can load or unload blanks and parts to and from presses. Such a machine must combine speed and dependability of operation with fast set-up and knockdown time. It must be adjustable to cooperate with a variety of different size presses and must also have the flexibility to adapt to a wide variety of part sizes and shapes. One of the major limitations on press production has been the time taken to load blanks into a press, extract them from the press, and transfer them to other presses or stations.

Various proposals pertaining to loaders, unloaders and other material transfer equipment have been made and utilized. However, they have all fallen short in being able to fulfill the needs present today in terms of cost, performance and flexibility. One of the major drawbacks in this regards has been the drive mechanism for advancing the work piece once it is introduced to the loader. For example, in some type loaders, at the ends of the carriage stroke the inertia of the carriage and its connected parts tends to cause over travel and therefore some type of deacceleration means is required. In this type of drive a loss of accuracy in the extreme forward and rearward positions of the carriage results and increases the loading on the drive mechanism. In addition, in attempts to use a single chain drive, heretofore only a single pusher member has been utilized on one side of the chain because of the presence of the drive shafts or axles of the chain sprockets located on the other side. Thus, a lateral force is exerted on the chain which tends to greatly increase the normal stresses in the chain and pusher member thereby increasing the fatigue factor and causing rapid loosening or wear. To counteract these problems, present proposals have proven to be too costly and complex. Also, present proposals have not operated smoothly and continuously free of sudden stops and back-and-forth jerks at various speed settings. Thus, there exists a need today for an apparatus that functions both as a loader and unloader for presses which is light-weight, compact and yet heavy-duty in overall operation at relatively low cost. In addition, there is a continuing need for such a device which is adjustable to adapt to a wide range of work situations.

SUMMARY OF INVENTION

This invention provides an improved material handling device which can be utilized as both a loader and unloader for presses which greatly overcomes many of the disadvantages present in the state of art today. One important aspect provided by this invention and overcoming these disadvantages is the utilization of a single-chain drive means (rather than a two-chain drive) for reciprocally moving a carriage back and forth in the guide track in such a way as to alleviate many of the unbalanced stresses heretofore imparted on a single chain. In the use of this single chain drive, I have devised a means as described below for advancing the carriage with two pushers, one on each side of the chain. Additional important aspects provided by this invention is the flexibility in adjustment of the loader for adaptation to a wide variety of part sizes, shapes, and uses. Also, a unique pusher mounting assembly distributes the forces applied to the chain more evenly than heretofore possible.

According to this invention, a carriage is mounted within a guide on a frame for reciprocal movement to advance materials from one end to the other of the guide. The carriage is driven back and forth by a drive means comprising a single endless chain mounted beneath the guide track about a drive and idler sprocket in a generally vertical plane. A pusher means including a first and second pusher dog extending from each side of the chain is mounted thereto for continuous reciprocal movement therewith along an upper and lower path. A yoke connected to the carriage includes a vertically orientated elongated slot for receipt of the first pusher dog, the slot extending beyond the diameter of the sprockets so that the first pusher dog is operative for continuous confined movement in the slot to drive the yoke and carriage back and forth along the guide track. A half yoke is also provided for connection to the carriage and is spaced from the other yoke on the opposite side of the chain and likewise includes a vertically elongated slot for receipt of the second pusher dog. The half yoke terminates above the drive axle sprocket with the slot open at its lower end to receive and release the second pusher dog such that the second pusher dog is confined in driving engagement with the half yoke slot during the upper movement only of the second pusher dog along the upper path of the chain.

In a preferred aspect, the chain is centered beneath the carriage and advances the work piece during the upper movement of the pusher dogs so that the load concentration on the chain is centered with respect thereto as a result of both pusher dogs engaging the yokes uniformly on each side. In other preferred aspects, the guide track is adjustable to accommodate parts of various sizes and widths, and the carriage includes a pair of pusher arms which are adjustable longitudinally to adapt to various size and types of presses. The drive train assembly is powered electrically or pneumatically and is harmonic for smooth and continuous movement in either direction free of sudden stops and back-and-forth jerks regardless of the speed selected. The loader is compact and light-weight and operable by a single switch in connection with the press. As an unloader, the carriage includes means for advancing the work piece from the die onto the unloader for transfer by the carriage to the opposite end of the guide track. Additional aspects in the preferred embodiment of this invention calls for a gear driven chain with a unique mounting plate adapted to be connected to the chain at more than one point to distribute the loading on the chain over more than one chain length. In addition, an axle or stem means is mounted to the plate and spaced from the chain with the pusher dogs being mounted on each end of the axle and rotatable with respect thereto so that the pusher dogs are in effect rollers engaged in the yoke slots to reduce the effects of friction.

Thus, the loader provided by this invention provides several unique advantages and objectives which are not always compatible in the prior art and in so doing overcomes many of the disadvantages present today. To summarize, this invention provides a light-weight, compact relatively low cost loader which is extremely flexible to adapt to different work criteria and yet dependable through the complete range of its operation.

DESCRIPTION OF THE PREFERRED EMBODIMENTS

Figure 1:
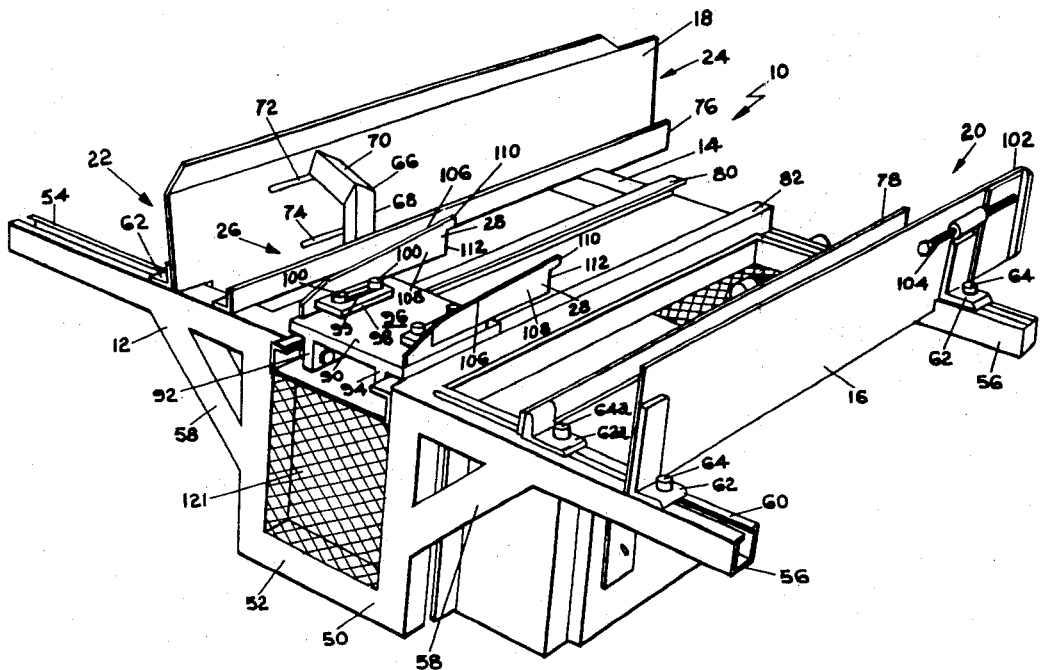
FIG. 1 is a perspective view of the material handling device provided by this invention.

Referring briefly to the drawings, loader 10 includes a frame 12 having an upper bed 14 for receiving and supporting the work pieces or blanks (not shown). Adjustable side wall 16 and 18 define a guide 20 for the loader which guides the work piece from one end 22 to and off the other end 24. The work is propelled by a carriage 26 having a pair of pusher arms 28, 28, carriage 26 moving reciprocally back and forth along the guide. Carriage 26 is driven by a drive mechanism 30 having a single gear chain 32 mounted vertically for over-under back-and-forth movement. A pair of pusher dogs 34 and 36 operatively engage a pair of slotted yokes 38 and 40 connected to carriage 26 to provide continuous and smooth movement of carriage 26 back-and-forth. During the forward work movement of carriage 26, the force generated on chain 32 is centered with respect thereto thus alleviating side loading. While the following description pertains specifically to a sheet metal loader and unloader, the concepts are envisioned as having much broader utilization.

Referring now to the drawings in detail, and specifically FIG. 1, the loader frame 12 is shown to be comprised of a generally U-shaped central support 50 which extends longitudinally the length of the loader with the side opposite the web portion 52 facing upward to facilitate the mounting and guiding of carriage 26. Central support element 50 is comprised of framing which is conventionally welded or fastened together to form a generally U-shaped frame. A pair of cross supports 54 and 56 extend laterally outwards from the upper corners of each end of frame 50 to act as supports for the guide and track means to be described hereinafter. Cross supports 54 and 56 are anchored at one end to frame 50 and preferably braced by welding one end of an angle support 58 to each cross support, the opposite end being welded to frame 50. Cross supports 54 and 56 are generally C-shaped tubular members positioned with the opening 60 facing up to permit easy attachment of the guide means 20. Side walls 16 and 18 are mounted on cross supports 54 and 56 and are adjustable laterally to facilitate sheet metal blanks or other part materials of varying widths. Side walls 16 and 18 extend vertically upwards and include an L-shaped flange 62 mounted at each lower end to the side walls. The opposite leg can then be positioned over cross supports 54 and 56 and fastened within opening 60 of the cross supports. Sliding adjustment is provided by simply loosening the fasteners 64 such as a bolt and nut, sliding the side wall to a desired position and then tightening it down to anchor it at that point to the cross bar.

Generally, the sheet blanks are positioned above the loader and manually or otherwise moved onto the loader to rest on its upper surface. The inner wall of each side wall 16 and 18 includes a part guide 66 the lower portion 68 of which is vertical while the upper portion 70 is inclined to act as a guide for the material as it is pushed or placed onto the top of the loader. The vertical portion 68 also positions the blank longitudinally on the loader and prevent backward movement of the blank as the carriage reciprocates underneath it. A pair of longitudinally extending slots 72 and 74 are provided through each side wall 16 and 18 to facilitate mounting guide 66 thereto as well as providing a means for its longitudinal adjustment. Side walls 16 and 18 in effect form the lateral limits of a guide track 20 for the blanks to be loaded on the press. The support bed 14 for the blanks is defined by a pair of laterally adjustable longitudinally extending rails 76 and 78. The rails extend the length of the loader and are affixed to cross supports 54 and 56 in similar fashion to side walls 16 and 18. That is, an L-shaped bracket 62a and fastener 64a such as a bolt and nut anchor rails 76 and 78 at each end to cross supports 54 and 56. The simple loosening of the fastener permits lateral adjustment of the rail depending on the spacing of the side walls and the configuration of the part member. It will be appreciated, that in accordance with the preferred embodiment, the minimum width of the guide means 20 which includes bed 14 is limited by the inner end of cross supports 54 and 56. These terminate at the upper leg portions of the U-shaped support frame 50, within which and above which is mounted the carriage 26 and drive mechanism 30 which will be described in more detail hereinafter. The outer limits of the width of guide track 20 is defined by the length of cross bars 54 and 56. It has been found that the optimum range of adjustment for a sheet metal loader which as shown in the drawings is one which can accommodate parts varying in width from 12 inches to 8 feet.

Figure 3:
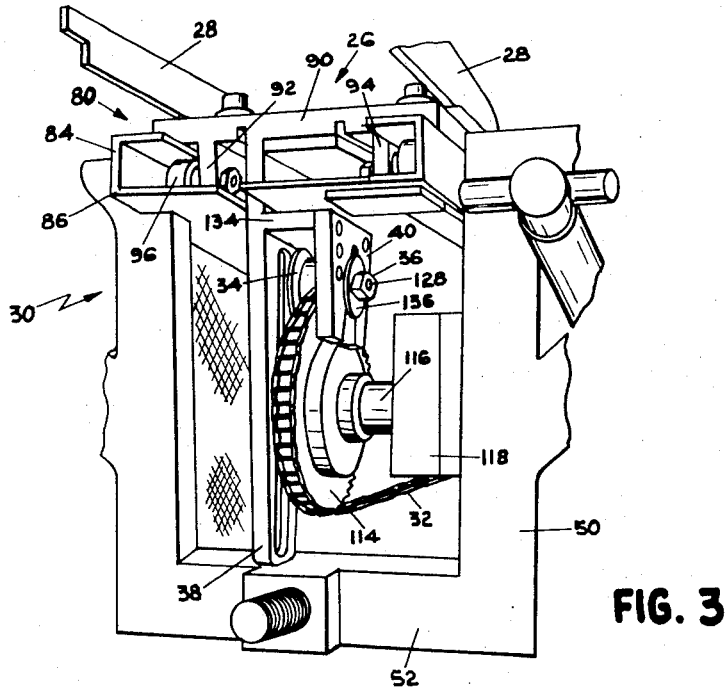
FIG. 3 is a perspective view similar to FIG. 2 taken from a different angle and showing two pusher members in driving position.
Figure 2:
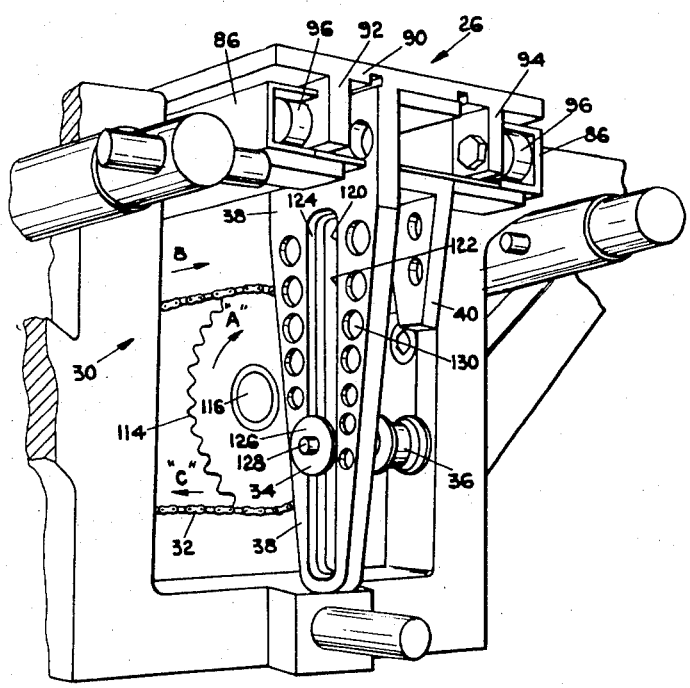
FIG. 2 is a perspective view of the unique drive means provided by this invention showing only one pusher member in driving position.

Central support frame 50 includes a pair of longitudinally extending supports 80 and 82 welded or fastened to the inner upper ends of frame 50. Preferably, supports 80 and 82 are generally U-shaped with the web portion 84 (FIG. 3) vertically aligned with and in abutment with the upper portions of frame 50 so that the opened portion opposite web 84 faces inwardly. In this fashion, supports 80 and 82 define a pair of guide tracks 86 for carriage 26. With reference to FIGS. 1-3, carriage 26 is comprised of a generally flat plate 90 which rests on the upper surfaces of guide tracks 86. A pair of downwardly depending flanges 92 and 94 extend from plate 90 and are spaced inwardly to clear the leg portions of tracks 86. A plurality of rollers 96 are secured to flanges 92 and 94 and extend outwardly therefrom for disposition intermediate the two leg portions of each guide track 86. In effect, the carriage is locked between guide tracks 86 since the upper and lower legs of each guide track prevents vertical displacement of the carriage while the web portion of each track prevents horizontal displacement. Preferably, horizontal rollers (not shown) are utilized for engagement against the outer edges of each leg portion. In this case, the legs prevent horizontal displacement.

Affixed to the upper surface 96 of plate 90 are a pair of finger-like pushers 28 extending longitudinally in the direction of advancement. Each pusher 28 is mounted to plate 90 by a special mounting bracket 98 (FIG. 1) which positions the pusher along the outer periphery of plate 90 in spaced relationship to each other. Bracket 98 includes fasteners 100 which extend through a longitudinally extending slot 99 through bracket 98 so that the longitudinal extension of pushers 28 in the direction of advancement of the loader is adjustable within limits to provide variable pusher extensions as the loader is operated. Under certain conditions, loader 10 might be spaced somewhat from the press so that the extension of pushers 28 is necessary to positively push the sheet metal blank onto the die. For this very same reason, side walls 16 and 18 can be extended by a supplemental portion 102 (shown in FIG. 1) which is removable in the event it is not required. A sliding bolt mechanism 104 is shown for mounting supplemental side wall 102 to side wall 16 or 18.

The upper surface 106 of pushers 28 are formed and shaped to act as cams to insure the lifting of the work piece up over the pushers so that they can be positioned behind the work piece to advance it onto the press. Preferably, the upper surfaces 106 are sloped abruptly from the upper surface of plate 90 at the rear end of pushers to a point intermediate the pusher ends wherein the slope is significantly decreased but still upwards toward a maximum position at the forward end 108 of the pushers. The forward ends 108 include an upper projecting portion 110 which extends slightly beyond the vertical front surface 112 of the forward end so that when a work piece is dropped down in front of the forward end 108, projections 110 prevent their accidental or unintentional vertical displacement. Hence, projection 110 acts as a keeper for the work piece when it is positioned in front of the pushers.

Cam surfaces 106 on pushers 28 prevent interference from work pieces being supplied to the loader when the carriage is in an advanced position. That is, regardless of the longitudinal position of carriage 26, a successive work piece is prevented from being positioned in front of pushers 28 except when the carriage is in its rearwardmost position so that the next blank will drop down in front of the pushers. If a work piece is being advanced when a second piece is dropped down over the carriage, the pushers will simply slide under the second work piece until the pushers have advanced the first work piece off the loader and are returned to the initial start position which permits the second piece to drop in front of pushers. Generally, guide 66 is positioned longitudinally with respect to the loader so that any work piece pushed into position cannot be moved toward a rearward position exceeding the starting position of carriage 26. Generally, no problem exists since the work pieces are sequentially advanced to the loader as each successive one is transferred to the press. However, the configuration described insures non-interference between two different work pieces. In accordance with the foregoing, carriage 26 and pushers 28 are centered laterally with respect to the loader frame 50 intermediate the legs of central support frame 50.

Referring now specifically to FIGS. 2 and 3, a drive mechanism 30 is shown which imparts reciprocal and continuous movement of the carriage forward and backwards in order to transfer work pieces positioned thereon onto a press or other material handling apparatus.

In accordance with this invention, a single continuous gear chain 32 is mounted in a generally vertical plane for movement about a horizontal axis between a pair of sprockets. Only one of the sprockets, driven sprocket 114 is shown. Driven sprocket 114 is connected by an axle 116 in a conventional fashion to a mounting bracket 118 for operative association with a conventional power source which is well known. Preferably, the chain is centered beneath carriage 26 with socket 114 rotating in the direction of arrow A. In this fashion, chain 32 makes an upper and lower path moving forwardly in the direction of arrow B when in the upper path while moving rearwardly in the direction of arrow C when moving in the lower path. The entire drive mechanism is enclosed in a cage 121 (FIG. 1) to protect the operator.

Carriage 26 is reciprocally driven through the cooperation of a pusher dog 34 mounted to chain 32 and a vertically extending yoke 38 attached to the carriage. Pusher dog 34 projects to one side of chain 32 and is confined within an elongated slot 120 of yoke 38 having a front and rear wall 122 and 124. With the chain and sprockets being centered with respect to the carriage, yoke 38 extends slightly off center from carriage 26 so that it is immediately adjacent the chain and sprockets on the same side that pusher dog 34 projects. In a preferred aspect, pusher dog 34 is comprised of a roller 126 in the form of a spool mounted for rotation on pin 128 which is anchored to chain 32 in a manner to be described in more detail hereinafter. Briefly, the carriage is motivated as follows. With pusher dog 34 mounted within slot 120, movement of pusher dog 34 along chain 32 in the forward direction indicated by arrow B provides driving engagement between pusher dog 34 and front wall 122 of slot 120 toward its upper end causing carriage 26 to move in a forward material advancing direction. As the portion of chain 32 which includes pusher dog 34 reaches sprocket 114 it moves around the circumference of sprocket 114 through a transitional stage wherein it changes its direction from the forward direction of arrow B to the lower path or rearward direction of arrow C. During this transitional movement, pusher dog 34 continues to move carriage 26 forwardly as it is moved through an angle of roughly 90 degrees from the upper portion of sprocket 114 to its mid portion with pusher dog 34 moving vertically downwards along slot 120. Through the second half of the transitional portion through an angle of approximately 90° from the mid portion of sprocket 114 to the lower outer extremity, pusher dog 34 continues to move vertically downwards through slot 120 but is transferred from driving engagement with front wall 122 to rearward driving engagement with rear wall 124 precipitating the reciprocal movement of carriage 26 in a direction indicated by arrow C. Once the portion of chain 32 which includes pusher dog 34 disengages from sprocket 114, movement of the pusher dog and its driving emphasis to yoke 38 is horizontally rearward as indicated by arrow C with pusher dog 34 in a form of roller 126 engaging rear wall 124 of slot 120 toward the lower end of slot 120. When the portion of chain 32 which includes pusher dog 34 reaches the opposite end of its continuous path, it engages the rear sprocket (not shown) for movement through a second transitional phase during which it functions similarly to that previously described except that the directions of movement are reversed. It will be appreciated that in accordance with this invention, pusher dog 34 and yoke 38 extend to the side of chain 32 and sprocket 114 opposite that of drive axle 116 so that a clear path is maintained for movement of yoke 38 alongside the chain and sprockets.

Yoke 38 is shown clearly in FIG. 2 and has a slightly wedge-shape in addition to a plurality of openings 130. The preferred configuration is designed from the standpoint of economy with the openings 130 reducing the overall material weight of the yoke, the same consideration being provided by its wedge shape. As a practical matter, the maximum stresses on the yoke occur during the forward, driving advancement of the yoke and carriage which calls for the engagement of pusher dog 34 and front wall 122 at the upper extremity of yoke 38. Hence, the wedge shape provides greater strength on the upper portion of yoke 38 as opposed to the lower portion which is simply concerned with forces necessary to return the carriage without handling any material.

Figure 7:
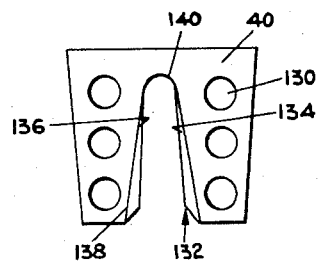
FIG. 7 is a side elevation view of the half yoke assembly provided by this invention.

With yoke 38 and pusher dog 34 being slightly off center with respect to drive chain 32, lateral forces are exerted on chain 32 in addition to the normal tensile forces. It has been found that the lateral force exerted on chain 32 is generally of little concern when the carriage is being retracted from its material advanced position when there is no loading on the carriage. However, within the anticipated use of this loader, some work pieces are of sufficient weight such that steps must be taken to counteract this lateral force during the work advancing stage to eliminate unnecessary fatigue and strain on the chain and pusher dog assembly. In addition, these lateral forces may cause uneven, jerky movement of the carriage. To counteract this, a second half-yoke 40 is positioned on the opposite side of chain 32 from yoke 38 for engagement with a second pusher dog 36 projecting on the opposite side of chain 32 from pusher dog 34. This second yoke 40 shown in FIGS. 2, 3 and 7 likewise includes a slot 132 having a front inner wall 134 and a rear inner wall 136 arranged for engagement by pusher dog 36. Yoke 40 is distinguished from yoke 38 however in that slot 132 is opened at its lower end. In addition, the vertical extension of yoke 40 is significantly less than yoke 38 so that it is capable of continuous movement with carriage 26 without interfering with the sprocket axles such as axle 116 shown in FIG. 3. Yoke 40 is provided for driving engagement by pusher dog 36 essentially during the upper path only of the pusher dog. Its primary function is to center the loading transmitted to the chain and pusher assembly so that the only force exerted on chain 32 is the tensile force exerted by the load. Hence, it prevents a lateral twisting of chain 32 during advancement. In the embodiment shown, (FIG. 3) yoke 40 is attached to yoke 36 by a lateral extending flange 134. Preferably, these elements are welded together for strength.

Pusher dog 36 is identical to pusher dog 34 and is comprised of a roller 136 in the form of a spool mounted to pin 128 which projects from both sides of chain 32. Half yoke 40 likewise includes a plurality of openings 130 to reduce the overall weight of the yoke and is slightly wedge-shaped for the same reasons described previously with respect to yoke 38. Slot 132 however has a slightly different cross sectional configuration in that it is wedge-shaped so that its lower opening 138 is somewhat wider than its upper end 140. This is to facilitate the entry and removal of pusher dog 36 as it is driven by chain 32. Referring to FIG. 3, pusher dog 36 is shown engaged with half yoke 40. However, as pusher dog 36 is moved to the transitional phase around sprocket 110, it becomes disengaged from half-yoke 40 and remains disengaged through its entire movement along the lower path of chain 32 in the direction of arrow C (FIG. 2) until it engages the rear sprocket (not shown) for movement through the transitional phase into upper path B. During the upper portion of this transitional phase, pusher dog 36 will re-enter slot 132 for engagement with front wall 134. As pusher dog 36 moves vertically upwards to the upper portion of this transitional phase, it will become positively secured within slot 132 during the material advancing phase of the loader during the movement of the pusher mechanism along the upper path B. At this point, both pusher dogs 34 and 36 are positively engaged with yokes 38 and 40 respectively. The loading is thus centered to eliminate lateral stress on the chain with the resultant loading being entirely tensile.

Figure 4:
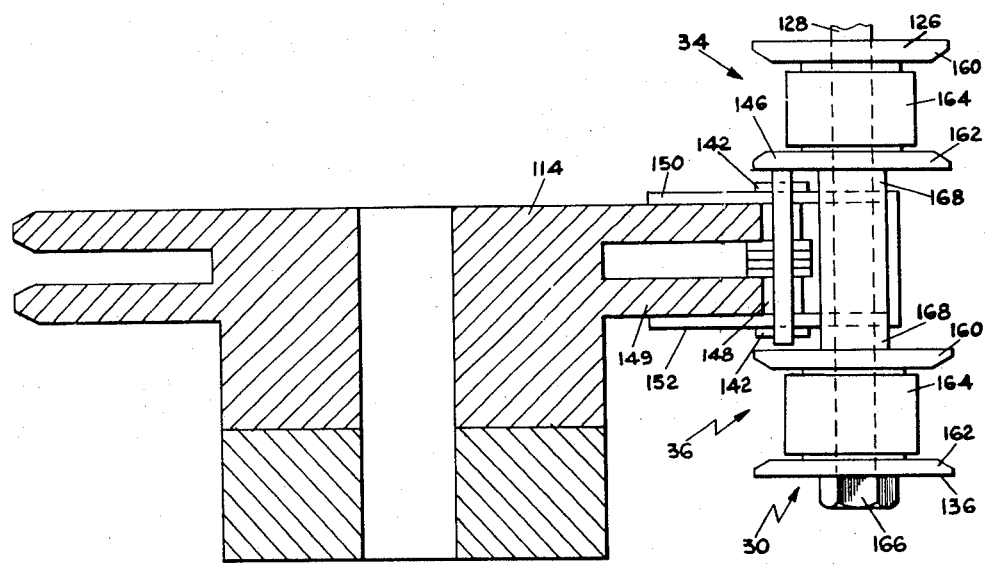
FIG. 4 is a plan view of the pusher means proposed by this invention with a sprocket shown in cross section, this view being of enlarged proportions with respect to the other drawings.
Figure 5:
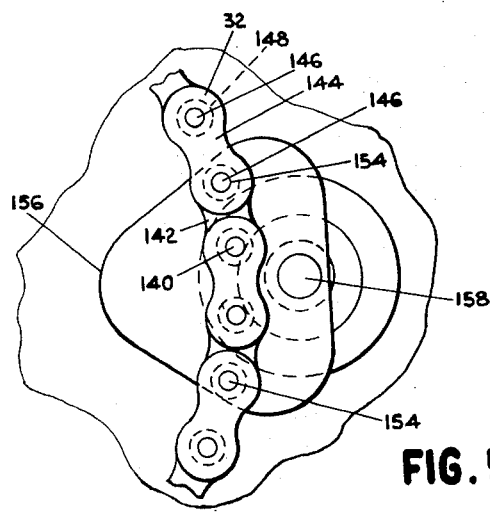
FIG. 5 is a side elevation view of the connector plate provided by this invention.

Turning now to FIGS. 4 and 5, drive mechanism 30 which includes pusher dogs 34 and 36 is shown in more detail. Chain 32 is preferably a gear-driven type chain comprising a plurality of pairs of spaced inner plates 142 and outer plates 144 linked together by a pin 146. A cylindrical roller element 14 (FIG. 4) is held between each pair of plates by pin 146 with the teeth 149 of sprocket 114 fitting intermediate each roller 148 in a conventional fashion.

Pusher dogs 34 and 36 are mounted to chain 32 by a novel pair of spaced mounting plates 150 and 152. The plates are identical to each other and preferably comprise a generally triangular configuration as shown in FIG. 5. Each plate includes four accurately spaced openings 154 dimensioned to permit the insertion of chain pin 146 so that each plate is mounted and connected to three separate links of the chain. The radius of the arcuate spacing preferably corresponds to the radius of sprocket 114 so that as the mounting plates and pusher dogs mounted thereto move about the sprocket 114, the extending teeth portion 149 in addition to engaging chain 32 become positioned intermediate plates 150 and 152 to reduce the amount of lateral movement of the pusher dogs during their engagement with sprocket 114. The plates are oriented so that the apex 156 of each plate is directed inwardly toward the center of the sprockets, or in the alternative the axis of rotation. In this fashion, a major portion of the mass of each plate is positioned radially out from chain 32, this latter portion holding the pusher dogs and thereby providing the greatest strength at the locus of highest force concentration.

Each plate includes an opening 158 positioned radially outward from openings 154 and centered with respect to the plate for receipt of pin 128. Pusher dogs 34 and 36 are mounted on each end respectively of pin 128 and as indicated earlier, preferably comprise a pair of rollers 126 and 136. Each roller 126 and 136 includes a pair of spaced side walls 160 and 162 with a roller bearing 164 intermediate each side wall. The diameter of side walls 160 and 162 substantially exceeds that of bearing 164 so that when the rollers are positioned within the yoke, the side walls prevent their lateral removal. Preferably, each end of pin 128 includes threads so that the pusher dogs 34 and 36 can be mounted thereon and anchored thereto by a pair of bolts 166 (one of which is shown in FIG. 3). A pair of tubular spacers 168 are provided between each pusher dog and mounting plate to avoid excessive lateral movement of the pusher dogs. Although the location of pin 128 is spaced from chain 32 thereby creating a moment arm with respect to the chain, the overall arrangement provides a stronger connection to the chain since it is interconnected to three links. Thus the forces transmitted to the chain are taken up by four separate chain pins 146.

OPERATION

Having described the various components in detail, their operation and cooperation should be obvious. Briefly, referring to FIG. 1, side walls 16 and 18 are each spaced from carriage 26 in accordance with the overall width of the work piece. By simply loosening fastener 64, each side wall can be laterally adjusted along cross bars 54 and 56. Depending on the overall width of the work product, rails 76 and 78 are also adjusted in the same fashion as side walls 16 and 18 are adjusted for support of the work piece. Depending on the overall length of the work pieces, guide 66 is adjusted longitudinally on each side wall 16 and 18 so that as a particular work piece is advanced onto the loader, it is positioned by guide 66 so that its rearwardmost end will be in front of pusher's arms 28 when the carriage is in its rearwardmost position so that pusher arms 28 will pick the work piece up for advancement onto the press. The overall length of pusher arms 28 can be adjusted within limits by adjusting the pusher arms 28 relative to carriage plate 90. The loader is then connected to or positioned adjacent to the particular press or other apparatus to which the work piece is to be advanced. Loader 10 can be conventionally supported by a base structure (not shown) or some other type of mounting arrangement. The reciprocal operation of carriage 26 is provided by the confinement of pusher dog 34 in slot 120 of yoke 38 so that as the portion of chain 32 which includes pusher dog 34 is advanced forward, pusher dog 34 engages front surface 122 of slot 120 to drive the carriage forward. During the transitional phases as the pusher dog is transmitted around the sprockets, the pusher dog moves vertically as well as horizontally depending on its position with respect to the sprocket. This circumferential movement of the pusher dogs provides for smooth acceleration and deacceleration of the carriage as it reciprocates. As it moves rearward in the direction of arrow C (FIG. 2), driving engagement between pusher dog 34 is provided on rear surface 124 of slot 120 to move the carriage back in order to pick up the next work piece.

In order to alleviate undesirable lateral forces on the chain during advancement of the work piece, a half yoke 40 is mounted from yoke 38 on the opposite side of chain 32 for intermittent cooperation with slot 132 in half yoke 40. This engagement occurs when that portion of chain 32 which includes pusher dog 36 is traveling along the upper path in the direction of arrow B to advance the work piece from the loader onto the press or other apparatus. During this engagement, the loading is centered over chain 32 so that only longitudinal force is exerted on the chain.

MODIFICATION

Figure 6:
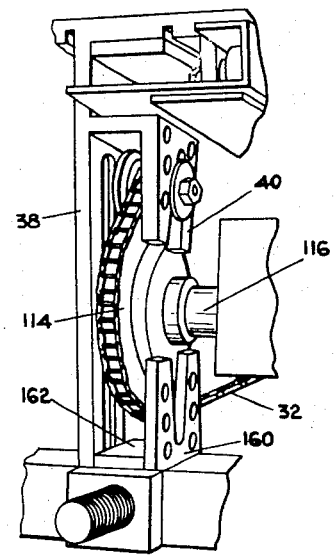
FIG. 6 is a perspective view similar to FIG. 3 of an alternative embodiment provided by this invention.

Referring now to FIG. 6, an alternative arrangement is shown wherein a second half yoke 160 similar to half yoke 40 is mounted conversely below half yoke 40 from the lower portion of yoke 38. As shown in FIG. 6, this can be done simply by welding a second lateral flange portion 162 to the lower end of yoke 38 from which yoke 160 is then mounted vertically upward. This particular alternative arrangement permits central loading on the chain during both the upper and lower paths of pusher dogs 34 and 36. The spacing between half yokes 40 and 160 is necessitated in order to provide clearance for axle 116 which drives sprocket 110. As a result, pusher dog 36 will be disengaged from either half yoke during a portion of transitional phases on each end of its path when it is at the forward or rearward outer extremity of the sprockets. Thus, at that point wherein the carriage changes its direction, the carriage is motivated only by the engagement between pusher dog 34 and yoke 38. However, it will be appreciated that at these points, the carriage is at a reduced speed either deaccelerating or slightly accelerating and the stresses are minimal.

Figure 8:
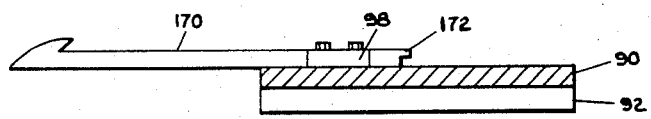
FIG. 8 is an elevation view of a puller mechanism utilizing my invention as an unloader.

Having described in detail the operation of my invention as a parts loader, it will be appreciated that a simple modification of carriage 26 changes the loader to an unloader. Such a modification simply replaces arms 28 with a pair of barbed pullers 170 extending rearwardly (FIG. 8) which reach out to pull the stamping from the die after it has been conventionally raised. As each part is removed from the press onto the loader, it can be positioned for a secondary movement off the loader by the nose end 172 of puller 170. Since it is well within the skill of this art to utilize my invention as an unloader, greater detail is unnecessary.

Although several embodiments have been shown and described in detail, it will be obvious to those having ordinary skills in this art that the details of construction of these particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows:

1. A pusher dog assembly mounted to an endless sprocket driven chain for advancing a carriage having a pusher dog holdback means extending to each side of the chain comprising a pair of plates connected to each side of said chain and extending outwardly beyond the chain, said plates including a plurality of arcuately spaced openings for mounting said plates to at least three consecutively linked chain links, said openings adapted to receive portions from each of said three consecutively linked chain links, said plates also including an additional opening spaced outwardly beyond the chain for receipt of a pin spaced outwardly from each side of said chain and extending transversely to said plates, and a pusher dog mounted to each end of said pin for cooperative driving of said holdback means alongside said chain, whereby said pusher dog assembly prevents twisting of the chain imparted by the moment force on said assembly and chain by the side engagement with the holdback means.

2. The pusher dog assembly according to claim 1 wherein the pusher dog holdback means includes means engageable on each side of the chain, at least one side being engaged with the pusher dog assembly intermittently relative the other, and each end of said pin includes a pusher dog comprising a roller means engageable with said holdback means.

3. The pusher dog assembly according to claim 1 wherein said plates are triangularly shaped, the apex of each plate projecting inwardly from said chain so that when said assembly is moved along said chain about said sprocket, the chain engaging portions of said sprocket are captured in part between said plates.

4. A pusher dog assembly mounted to an endless sprocket driven chain for advancing a work piece having a pusher dog holdback means extending to each side of said chain, at least one side being intermittently driven relative the other, said pusher dog assembly comprising, in combination: a pair of plates connected to each side of said chain, said plates extending outwardly beyond the chain and including a plurality of arcuately spaced openings for mounting said plates to at least three adjacent chain links, said openings adapted to receive portions from each of said three adjacent chain links, said plates also including an additional opening spaced outwardly from said chain for receipt of a pin spaced outwardly from said chain and extending transversely to said plates, each end of said pin including a pusher dog comprising a roller means engageable respectively with said holdback means for driving engagement therewith, said pusher dog assembly preventing twisting of the chain imparted by the moment force of said assembly and chain when said holdback means extending to each side of said chain is engaged by both said pusher dog roller means.

* * * * *